(12) United States Patent
Storey et al.

(10) Patent No.: US 8,937,134 B2
(45) Date of Patent: Jan. 20, 2015

(54) VINYL ETHER END-FUNCTIONALIZED POLYOLEFINS

(71) Applicant: University of Southern Mississippi, Hattiesburgh, MS (US)

(72) Inventors: Robson F. Storey, Hattiesburg, MS (US); David L. Morgan, Richmond, CA (US)

(73) Assignee: The University of Southern Mississippi, Hattiesburg, MS (US)

( * ) Notice: Subject to any disclaimer, the term of this patent is extended or adjusted under 35 U.S.C. 154(b) by 0 days.

(21) Appl. No.: 14/075,906

(22) Filed: Nov. 8, 2013

(65) Prior Publication Data

US 2014/0135452 A1    May 15, 2014

Related U.S. Application Data

(63) Continuation of application No. 12/815,312, filed on Jun. 14, 2010, now Pat. No. 8,592,527.

(51) Int. Cl.
*C08F 8/26* (2006.01)
*C08F 8/18* (2006.01)

(52) U.S. Cl.
CPC ... *C08F 8/26* (2013.01); *C08F 8/18* (2013.01); *C08F 2810/40* (2013.01)
USPC ........ 525/333.7; 525/132; 525/384; 525/385; 526/348.7

(58) Field of Classification Search
CPC ........................................................ C08F 8/26
USPC ............. 525/333.7, 132, 384, 385; 526/348.7
See application file for complete search history.

(56) References Cited

U.S. PATENT DOCUMENTS

| 3,155,686 | A | 11/1964 | Prill et al. |
| 3,632,600 | A | 1/1972 | Morris et al. |
| 4,034,038 | A | 7/1977 | Vogel |
| 4,152,499 | A | 5/1979 | Boerzel et al. |
| 4,238,628 | A | 12/1980 | Cahill et al. |
| 4,255,538 | A | 3/1981 | Skillcorn |
| 4,276,394 | A | 6/1981 | Kennedy et al. |
| 4,342,849 | A | 8/1982 | Kennedy |
| 4,393,199 | A | 7/1983 | Manser |
| 4,429,099 | A * | 1/1984 | Kennedy et al. ................ 528/98 |
| 4,468,291 | A | 8/1984 | Naarmann et al. |
| 4,486,572 | A | 12/1984 | Kennedy |
| 4,568,732 | A | 2/1986 | Kennedy et al. |
| 4,758,631 | A | 7/1988 | Kennedy et al. |
| 4,814,405 | A | 3/1989 | Kennedy |

(Continued)

FOREIGN PATENT DOCUMENTS

DE    237072    7/1986
DE    240308    10/1986

(Continued)

OTHER PUBLICATIONS

Bae et al., "Beta-Proton Elimination by Free Bases in the Living Carbocationic Polymerization of Isobutylene," Macromolecules, 30, 7341-7344, 1997.

(Continued)

*Primary Examiner* — Kelechi Egwim
(74) *Attorney, Agent, or Firm* — Jones Day

(57) ABSTRACT

Provided herein are vinyl ether end-functionalized polyolefins and methods for producing the same.

25 Claims, 1 Drawing Sheet

(56) References Cited

U.S. PATENT DOCUMENTS

| | | |
|---|---|---|
| 4,910,321 A | 3/1990 | Kennedy et al. |
| 4,929,683 A | 5/1990 | Kennedy et al. |
| 4,943,616 A | 7/1990 | Mishra et al. |
| 4,946,899 A | 8/1990 | Kennedy et al. |
| 4,948,936 A | 8/1990 | Landry |
| 5,032,653 A | 7/1991 | Cheradame et al. |
| 5,066,730 A | 11/1991 | Kennedy et al. |
| 5,112,507 A | 5/1992 | Harrison |
| 5,122,572 A | 6/1992 | Kennedy et al. |
| 5,169,914 A | 12/1992 | Kaszas et al. |
| 5,175,225 A | 12/1992 | Ruhe, Jr. |
| 5,219,948 A | 6/1993 | Storey et al. |
| 5,225,492 A | 7/1993 | Kennedy et al. |
| 5,286,823 A | 2/1994 | Rath |
| 5,300,701 A | 4/1994 | Cherpeck |
| 5,334,321 A | 8/1994 | Harrison et al. |
| 5,336,745 A | 8/1994 | Cheradame et al. |
| 5,340,881 A | 8/1994 | Kennedy et al. |
| 5,350,786 A | 9/1994 | Costanzi et al. |
| 5,350,819 A | 9/1994 | Shaffer |
| 5,366,745 A | 11/1994 | Daden |
| 5,395,885 A | 3/1995 | Kennedy et al. |
| 5,428,111 A | 6/1995 | Faust et al. |
| 5,444,135 A | 8/1995 | Cheradame et al. |
| 5,448,000 A | 9/1995 | Gullapalli et al. |
| 5,451,647 A | 9/1995 | Faust et al. |
| 5,464,549 A | 11/1995 | Sieberth |
| 5,488,000 A | 1/1996 | Zhang et al. |
| 5,506,316 A | 4/1996 | Shaffer |
| 5,580,935 A | 12/1996 | Shaffer |
| 5,616,668 A | 4/1997 | Harrison et al. |
| 5,629,394 A | 5/1997 | Cheradame et al. |
| 5,637,647 A | 6/1997 | Faust et al. |
| 5,663,457 A | 9/1997 | Kolp |
| 5,663,470 A | 9/1997 | Chen et al. |
| 5,677,386 A | 10/1997 | Faust et al. |
| 5,690,861 A | 11/1997 | Faust |
| 5,777,044 A | 7/1998 | Faust |
| 5,945,491 A | 8/1999 | Matyjaszewski et al. |
| 5,948,936 A | 9/1999 | Itoh et al. |
| 6,033,446 A | 3/2000 | Cherpeck et al. |
| 6,121,379 A | 9/2000 | Yamanaka et al. |
| 6,194,597 B1 | 2/2001 | Faust et al. |
| 6,407,066 B1 | 6/2002 | Dressen et al. |
| 6,451,920 B1 | 9/2002 | Harrison et al. |
| 6,468,948 B1 | 10/2002 | Rossi et al. |
| 6,515,083 B2 | 2/2003 | Ozawa et al. |
| 6,642,318 B1 | 11/2003 | Chiefari et al. |
| 6,753,391 B1 | 6/2004 | Lewandowski et al. |
| 6,818,716 B2 | 11/2004 | Wendland et al. |
| 6,906,011 B2 | 6/2005 | Harrison et al. |
| 6,969,744 B2 | 11/2005 | Stokes et al. |
| 7,071,275 B2 | 7/2006 | Rath et al. |
| 7,124,110 B1 | 10/2006 | Kemp, II et al. |
| 7,244,870 B2 | 7/2007 | Lange et al. |
| 7,420,019 B2 | 9/2008 | Stokes |
| 7,501,476 B2 | 3/2009 | Stokes |
| 7,576,161 B2 | 8/2009 | Stokes |
| 7,705,090 B2 | 4/2010 | Stokes |
| 7,709,580 B2 | 5/2010 | Stokes |
| 7,816,459 B2 | 10/2010 | Stokes |
| 8,013,073 B2 | 9/2011 | Stokes et al. |
| 8,063,154 B2 | 11/2011 | Storey et al. |
| 2002/0082367 A1 | 6/2002 | McConville et al. |
| 2002/0132905 A1 | 9/2002 | Babinee et al. |
| 2003/0105194 A1 | 6/2003 | Stuart et al. |
| 2003/0162858 A1 | 8/2003 | Faust et al. |
| 2003/0191257 A1 | 10/2003 | Wettling et al. |
| 2004/0015029 A1 | 1/2004 | Lange et al. |
| 2004/0260033 A1 | 12/2004 | Stokes et al. |
| 2005/0282972 A1 | 12/2005 | Stokes et al. |
| 2006/0041081 A1 | 2/2006 | Stokes et al. |
| 2006/0041083 A1 | 2/2006 | Stokes et al. |
| 2006/0041084 A1 | 2/2006 | Stokes et al. |
| 2006/0135721 A1 | 6/2006 | Lange et al. |
| 2006/0264577 A1 | 11/2006 | Faust et al. |
| 2007/0155908 A1 | 7/2007 | Stokes et al. |
| 2007/0155910 A1 | 7/2007 | Stokes |
| 2007/0155911 A1 | 7/2007 | Stokes et al. |
| 2009/0247716 A1 | 10/2009 | Stokes et al. |
| 2009/0258803 A1 | 10/2009 | Harrison et al. |
| 2009/0318624 A1 | 12/2009 | Storey et al. |
| 2010/0099835 A1 | 4/2010 | Stokes |
| 2010/0184918 A1 | 7/2010 | Storey et al. |
| 2010/0249001 A1 | 9/2010 | Storey et al. |
| 2011/0028681 A1 | 2/2011 | Storey et al. |

FOREIGN PATENT DOCUMENTS

| | | |
|---|---|---|
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 206756 | 12/1986 |
| EP | 255181 | 2/1988 |
| EP | 342792 | 11/1989 |
| EP | 397081 | 5/1990 |
| EP | 400844 | 5/1990 |
| EP | 341012 | 12/1992 |
| EP | 959096 | 11/1999 |
| EP | 1209170 | 5/2002 |
| EP | 1489109 | 12/2004 |
| GB | 1159368 | 4/1987 |
| GB | 2184738 | 7/1987 |
| JP | 03287605 | 12/1991 |
| JP | 04020501 | 1/1992 |
| JP | 5-186513 | 7/1993 |
| JP | 2001172567 | 6/2001 |
| WO | WO 90/05711 | 5/1990 |
| WO | WO 94/13706 | 6/1994 |
| WO | WO 97/19962 | 6/1997 |
| WO | WO 99/09074 | 2/1999 |
| WO | WO 00/75202 | 12/2000 |
| WO | WO 03/106390 | 12/2003 |
| WO | WO 2004/048215 | 6/2004 |
| WO | WO 2006/110647 | 10/2006 |

OTHER PUBLICATIONS

Bae et al., "The Role of Pyridine Derivatives in Living Carbocationic Polymerization: Lewis Base or Nucleophile," Macromol, Symp., 132, 11-23, 1998.

Bauer et al., "Complexes of Stannic Chloride and Alkyl Phenols and the Influence of These Complexes and of Free Phenol on the Cationic Polymerization of Isobutene," Can. J. Chem., 48, 1251, 1970.

Bauer et al., "Cationic Polymerization of Isobutene Initiated by Stannic Chloride and Phenols: Polymer Endgroup Studies," J. Poly. Sci., A-1, 9, 1451-1458, 1971.

Bezumnova et al., "Reaction of 2-Mercaptobenzothiazole with Ethylenic Hydrocarbons," Khim. Geterosikl. Soedin., 80, 194, 1971 (English abstract).

Bin et al., "Study of the Interactions of Organic Sulfides with Active Species in the Cationic Polymerization of 1,3-Pentadiene," Polymer Bulletin, 51, 343-349, 2004.

Boileau et al., "Reaction of Functionalised Thiols with Oligoisobutenes via Free-Radical Addition. Some New Routes to Thermoplastic Crosslinkable Polymers," European Polymer Journal, 39, 1395-1404, 2003.

De et al., "Capping Reactions in Cationic Polymerization: Kinetic and Synthetic Utility," ACS Div. Polym. Chem., Polym. Preprs., 46, 847-848, 2005.

De et al., "Carbocationic Polymerization of Isobutylene Using Methylaluminum Bromide Coinitiators: Synthesis of Bromoallyl Functional Polyisobutylene," Macromolecules, 39, 7527-7533, 2006.

De et al., "Relative Reactivity of C4 Olefins toward the Polyisobutylene Cation," Macromolecules, 39, 6861-6870, 2006.

(56) References Cited

OTHER PUBLICATIONS

Depuy et al., "Electronic Effects in Elimination Reactions, V. The E2 Reaction of b-Phenylethyl Fluorides and Chlorides," J. Am. Chem. Soc., 82, 2535-3537, 1960.

Diaz et al., "A Polymer Electrode with Variable Conductivity: Polypyrrole," J.C.S. Chem. Comm., 397-398, 1980.

Diaz et al., "Electrochemical Polymerization of Pyrrole," J.C.S. Chem. Comm., 635-636, 1979.

Evsyukov et al., "Chemical Dehydrohalogenation of Halogen-Containing Polymer," Russian Chemical Reviews, 60, 373-390, 1991.

Faust et al., "Living Carbocationic Polymerization. XXI. Kinetic and Mechanistic Studies of Isobutylene Polymerization Initiated by Trimethylpentyl Esters of Different Acids," J. Macromol. Sci.—Chem., A27(6), 649-667, 1990.

Faust et al., "Living Carbocationic Polymerization. IV. Living Polymerization of Isobutylene," J. Polym. Sci. A Polym. Chem. 25, 1847-1864, 1987.

Feldthusen et al., "The Effect of Reaction Conditions on the Chain End Structure and Functionality During Dehydrochlorination of tert-Chlorine-Telechelic Polyisobutylene by Potassium tert-Butoxide," Macromol. Rapid Comm., 19, 661-663, 1998.

Fodor et al., "Synthetic Applications of Non-Polymerizable Monomers in Living Carbocationic Polymerizations," ACS Div. Polym. Chem., Polym. Preprs., 35(2), 492-493, 1994.

Gardini, "The Oxidation of Monocyclic Pyrroles," Adv. Heterocyl. Chem., 15(67), 67-99, 1973.

Campa et al., "Addition des thiols sur les double liaisons des polybutadienes hydroxyteleheliques radicalaire et anionique. Etude des mecanismes d'addition par 1H et 13C NMR," Makromol. Chem., 182, 1415-1428, 1981.

Gorski et al., "Functionalized Polyisobutenes by SH-en Addition," Die Angewandte Makromolekulare Chemie. 253, 51-64, 1997.

Hadjikyriacou et al., "Cationic Macromolecular Design and Synthesis Using Furan Derivatives," Macromolecules, 32, 6394-6399, 1999.

Hadjikyriacou et al., "Living Coupling Reaction in Living Cationic Polymerization. 3. Coupling Reaction of Living Polyisobutylene Using Bis(furanyl) Derivatives," Macromolecules, 33, 730-733, 2000.

Hadjikyriacou et al., "Living Coupling Reaction in Living Cationic Polymerization. 4. Synthesis of Telechelic Polyisobutylenes Using Bis-Furanyl Derivatives as Coupling Agents," JMS Pure Appl. Chem., A37, 1333-1352, 2000.

Hamley, Block Copolymers, Encyclopedia of Polymer Science and Technology, 457-482, Mar. 2003.

Higashihara et al., "Synthesis of Poly(isobutylene-block-methyl methzcrylate) by a Novel Coupling Approach," Macromolecules, 39(16), 5275-5279, 2006.

Ipatieff et al., "Reaction of Aliphatic Olefins with Thiophenol," J. Am. Chem. Soc., 60, 2731-2734, 1938.

Ivan et al., "Living Carbocationic Polymerization. XXX. One-Pot Synthesis of Allyl-Terminated Linear and Tri-Arm Star Polyisobutylenes, and Epoxy- and Hydroxy-Telechelics Therefrom," J. Polym. Sci.: Part A: Polym. Chem., 28, 89-104, 1990.

Ivan et al., "New Telechelic Polymers and Sequential Copolymers by Polyfunctional Initiator-Transfer Agents (Inifers)," J. Poly. Chem. Ed., 18, 3177-3191, 1980.

Kaszas et al., "Electron Pair Donors in Carbocationic Polymerization. 2. Mechanism of Living Carbocationic Polymerizations and the Role of in Situ and External Electron Pair Donors," Macromolecules 23, 3909-3915, 1990.

Kaszas et al., "Electron Pair Donors in Carbocationic Polymerization. 1. Introduction into the Synthesis of Narrorw Molecular Weight Distribution Polyisobutylenes," Polymer Bulletin, 20(5), 413-419, 1988.

Keki et al., "Dimethyldioxirane as a New and Effective Oxidation Agent for the Epoxidation of α,ω- Di(isobutenyl)polyisobutylene: A Convenient Synthesis of α,ω-Di(2-methyl-3-hydroxypropyl)-polyisobutylene," J. Poly. Sci. A Poly. Chem., 40, 3974-3986, 2002.

Kennedy et al., "New Telechelic Polymers and Sequential Copolymers by Polyfunctional Initiator-Transfer Agents, (Inifers) 10. Three-Arm Star Telechelic Polyisobutylenes Carrying Chlorine, Olefin or Primary Alcohol Endgroups," Polym. Bull. 4, 67-74, 1981.

Kennedy et al., "Living Carbocationic Polymerization. XXXIX. Isobutylene Polymerization in the Presence of Pyridine and Various Other Electron Donors," Journal of Macromolecular Science, Chemistry, A28(2), 197-207, 1991.

Kennedy et al., "New Telechelic Polymers and Sequential Copolymers by Polyfunctional Initiator Transfer Agents (Inifers) V. Synthesis of α-tett-Butyl-ω-isopropenylopolyisobutylene and α,ω-Di(isopropenyl)polyisobutylene," Polymer Bulletin, 1, 575-580, 1979.

Kennedy et al., "New Telechelic Polymers and Sequential Copolymers by Polyfunctional Initiator Transfer Agents (Inifers) 27 Bisphenol and Trisphenol Polyisobutylenes," Poly. Bull., 8, 563-570, 1982.

Kennedy et al., "New Telechelic Polymers and Sequential Copolymers by Polyfunctional Initiator-Transfer Agents, I." Polym. Prepr. (Am. Chem. Soc., Div. Polym. Chem.) 20(2), 316, 1979.

Kennedy et al., "New Telechelic Polymers and Sequential Copolymers by Polyfunctional Initiator-Transfer Agents, II. Synthesis and Characterization of α,ω-Di(tert-Chloro)polyisobutylenes," J. Polym. Sci., Polym. Chem. Ed., 18, 1523-1537, 1980.

Kennedy et al., "New Telechelic Polymers and Sequential Copolymers by Polyfunctional Initiator-Transfer Agents (Inifers)," Polym. Bull., 9, 27-32, 1983.

Kim et al., "Synthesis and Characterization of Novel Silicon-Functional Polyisobutylenes and Their Applications: Polyisobutylene Brushes on Silicate Substrates via Living Cationic Polymerization," Journal of Macromlecular Science Part A—Pure and Applied Chemistry, A40(10), 991-1008, 2003.

Klemm et al., "Untersuchungen zur Thioladdition an Polybutadiene," Angew Makromol. Chem., 207, 187, 1993 (English Abstract).

Klemm et al., "Unusual Addition by the Thiol-ene Photopolymerization," Polym. Bull. (Berlin), 28, 653-656, 1992.

Koroskenyl et al., "Initiation via Haloboration in Living Cationic Polymerization. 6. A Novel Method for the Synthesis of Primary Amine Functional Polyisobutylenes," Pure Appl. Chem., A36(12), 1879-1893, 1999.

Lenz, "Organic Chemistry of Synthetic High Polymers," Section 7.2 Poly(alkylene Sulfides), Interscience Publishers, New York, p. 196, 1967.

Li et al., "Polyisobutylene Supports—a Non-Polar Hydrocarbon Analog of PEG Supports," Tetrahedron, 61, 12081-12092, 2005.

Lu et al., "Living Cationic Isomerization Polymerization of beta-Pinene. 1. Initiation with HCl-2-Chloroethyl Vinyl Ether Adduct/TiCl3(OiPr) in Conjunction with nBu4NCl," Macromolecules, 30, 22-26, 1997.

Machl et al., "Novel Synthetic Routes to Aminofunctionalized Polyisobutylenes," ACS Div. Polym. Chem. Polym. Preprs., 44(2), 858-859, 2003.

Maenz et al., "Comb-like Polymers from Macromonomers Based on Low-Molecular Weight Poly(isobutene)s," Angewandte Makromolekulare Chemie, 258, 69-73, 1998.

Maenz et al., "Investigation of the Structure of Low Molecular Weight Polybutadienes and Epoxides Made Therefrom," Acta Polymerica, 47(5), 208-213, 1996.

Maenz et al., "Macromonomers Based on Low-Molecular-Weight Polyisobutenes," Angewandte Makromolekulare Chemie, 242, 183-197, 1996.

Martinez-Castro et al., "Polyisobutylene Stars and Polyisobutylene-block-poly(tert-butyl methacrylate) Block Copolymers by Site Transformation of Thiophene End-Capped Polyisobutylene Chain Ends," Macromolecules, 36, 6985-6994, 2003.

Mishra et al., "Living Carbocationic Polymerization, VIII.," J. P. Polym. Bull., 17, 7-13, 1987.

Mishra et al., "New Telechelic Polymers and Sequential Copolymers by Polyfunctional Initiator Transfer Agents (Inifers) LI. Synthesis and Characterization of Anisole Terminated Polyisobutylenes." Poly. Bull., 16, 47-53, 1982.

Morgan et al., "Thiol/Ene Photocurable Polymers." J. Polym. Sci. Polym. Chem. Ed., 15, 627-645, 1977.

(56) References Cited

OTHER PUBLICATIONS

Morgan et al., "End-Quenching of Quasi-Living Isobutylene Polymerization with Alkoxybenzene Compounds," Macromolecules, 42, 6844-6847, 2009.
Morgan et al., "End-Quenching of TiCl4-Catalyzed Quasiliving Polyisobutylene with Alkoxybenzenes for Direct Chain End Functionalization," Macromolecules, 43, 8724-8740, 2010.
Nemes et al., "Oxyethylation and Carbonation of Telechelic Polyisobutylene Anions," Poly. Bull., 24, 187-194, 1990.
Nielsen et al., "Synthesis of Isobutenyl-Telechelic Polyisobutylene by Functionalization with Isobutenyltrimethylsilane," Polymer, 38(10), 2529-2534, 1997, Elsevier Science Ltd.
Nuyken et al., "Novel Sulfur Containing Polymers," Makromol. Chem. Macromol. Symp., 26, 313-331, 1989.
Nuyken et al., "Telechelics via Addition of Dithiols onto Alkadienes, 1 Radical Mechanism," Makromol. Chem. Rapid Commun., 11, 365-373, 1990.
Nuyken et al., "New Telechelic Polymers and Sequential Compolymers by Polyfunctional Initiator-Transfer Agents (Inifers) 9. A Demonstration of Chain Extension of α,ω-Polyisobutylene-dioletins with Dithiols," Polym. Bull. (Berlin), 4, 61-65, 1981.
Odian, Principles of Polymerization, 4th ed., Wiley, Chapter 8, 2004.
Pernecker et al., "Living Carbocationic Polymerization, XLVI. Living Isobutylene Polymerization Induced by the Common Ion Effect," Polym. Bull., 26, 305-312, 1991.
Puskas et al., "Investigation of the Effect of Epoxide Structure on the Initiation Efficiency in Isobutylene Polymerizations Initiated by Epoxide/TiCl4 Systems," Euro. Polymer Journal, 39: 2147-2153, 2003.
Puskas et al., "The Nature of the Double Bond in Low Molecular Weight Polyisobutylenes and Polybutene Copolymers," J. Polymer Sci.: Symposium No. 56, 191-202, 1976.
Rooney, "Synthesis of Phenol-Terminated Polyisobuylene: Competitive Chain Transfer Reactions," J. Appl. Poly. Sci., 25, 1365-1372, 1980.
Roth et al., "A Novel Method of the Determination of Propagation Rate Constants: Carbocationic Oligomerization of Isobutylene," Macromolecules, 29, 6104-6109, 1996.
Sawamoto et al., "End Functionalized Polymers by Living Cationic Polymerization," Macromolecules, 20, 1-6, 1987.
Schriescheim et al., "Industrial Friedel-Crafts Chemistry: Past and future," Chemtech, 310-314, 1978.
Serniuk et al., "Study of the Reaction of Buna Rubbers of Aliphatic Mercaptans," J. Am. Chem. Soc. 70, 1804-1808, 1948.
Si et al., "Living Carbocationic Polymerization. Narrow Molecular Weight Distribution Polyisobutylenes Prepared by Esters and Ketones as Electron Donors," Polymer Bulletin (Berlin), 33(6), 651-656, 1994.
Simison et al., "End-Quenching of Quasiliving Carbocationic Isobutylene Polymerization with Hindered Bases: Quantitative Formation of Exo-Olefin-Terminated Polyisobutylene," Macromolecules, 39, 2481-2487, 2006.
Sita et al., "Amidinate-Based Catalysts for Stereoselective Living Ziegler-Natta Polymerizations," Abstracts of Papers of the American Chemical Society, vol. 224, Part 2. pp. U502-U502, 2002.
Stacey et al., Organic Reactions: vol. 13. pp. 150-208 and 233-333, 1963.
Storey et al., "Mechanistic Role of Lewis Bases and Other Additives in Quasiliving Carbocationic Polymerization of Isobutylene," Macromolecules 34, 5416-5432, 2001.
Storey et al., "N-Methylpyrrole-Terminated Polyisobutylene Through End-Quenching of Quasiliving Carbocationic Polymerization," Macromolecules, 38, 4618-4624, 2005.
The University of Southern Mississippi, "Synthesis and Characterization of Novel Polyisobutylene Based Materials: Gradient Block Copolymers, Exo-Olefins via in situ Quenching, and Carboxylic Acid Functional Telechelics," Dec. 2007.
Tripathy et al., "Syntheses and Characterization of Polyisobutylene Macromonomers with Methacrylate, Acrylate, Glycidyl Ether, or Vinyl Ether End-Functionality," Macromolecules 42, 3958-3964, 2009.
Ummadisetty et al., "Rapid Communication: Quantitative Syntheses of Novel Polyisobutylenes Fitted with Terminal Primary -Br, -Oh, -NH2, and Methacrylate Termini," J. Poly. Sci. A Poly. Chem., 46, 4236-4242, 2008.
Wallace et al., "Intelligent Polymer Systems," Encyclopedia of Polymer Science and Technology, 231-250, Jul. 2004.
Wollyung et al., "Intelligent Polymers Systems," J. Poly. Sci. A Poly. Chem., 43, 946-958, 2005.
Zhang et al., "Synthesis of Polyisobutylene with Arylamino Terminal Group by Combination of Cationic Polymerization with Alkylation," Poly. Sci. A. Poly. Chem., 46, 936-946, 2008.
Zinger et al., "Timed Release of Chemicals from Polypyrrole Films," J. Am. Chem. Soc., 106, 6861-6863, 1984.

* cited by examiner

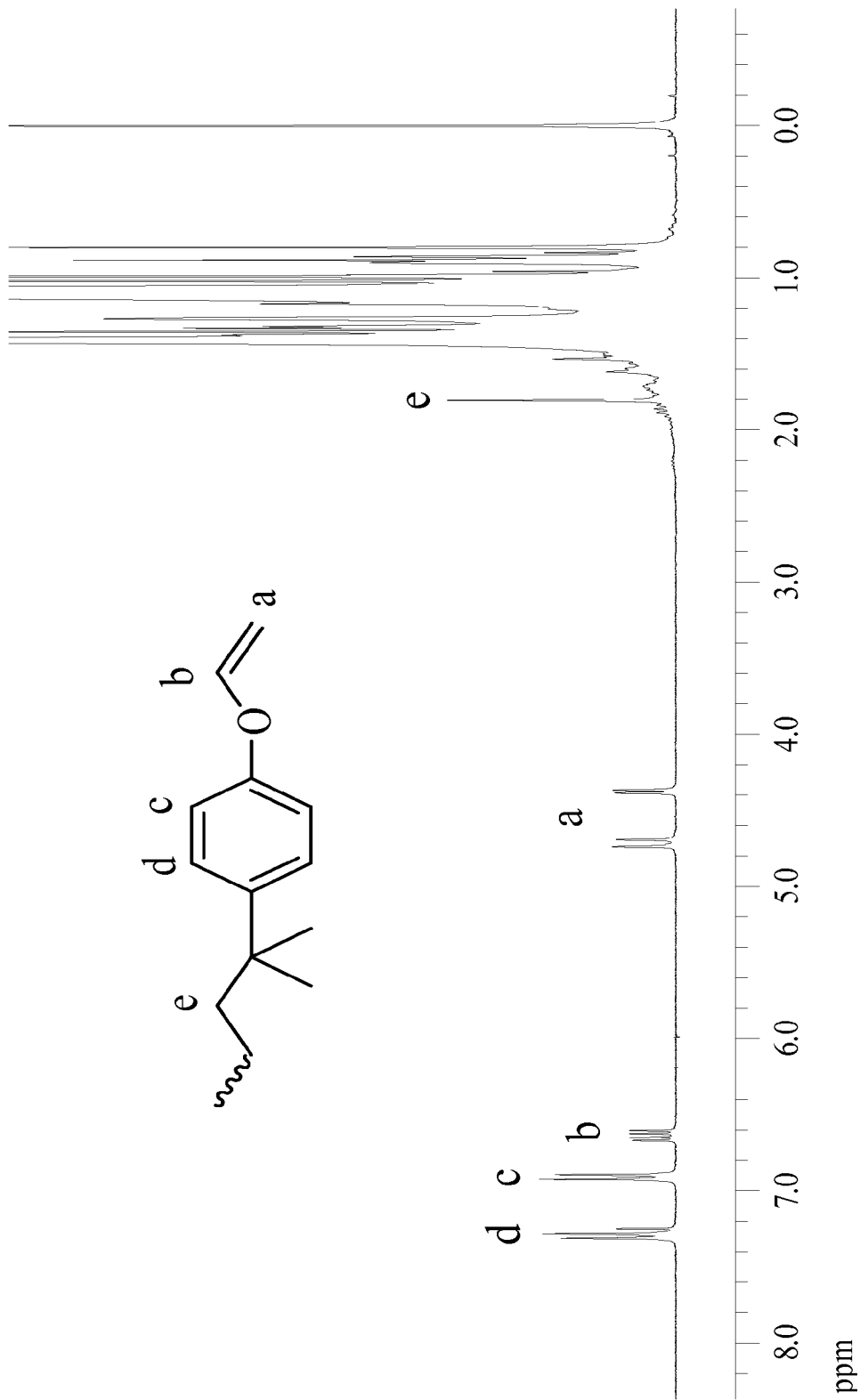

VINYL ETHER END-FUNCTIONALIZED POLYOLEFINS

1. CROSS REFERENCE TO RELATED APPLICATIONS

This application is a continuation of U.S. patent application Ser. No. 12/815,312, filed Jun. 14, 2010, the disclosure of which is incorporated herein by reference in its entirety.

2. FIELD

Provided herein are vinyl ether end-functionalized polyolefins and methods for producing the same.

3. BACKGROUND

Telechelic polymers are polymers that contain one or more functional groups at the end of the polymer. These functional groups are reactive to other molecules, thereby allowing derivatization of the polymer at its chain ends. Thus, telechelic polymers serve as useful intermediates for the preparation of a diverse range of desirable polymeric products, including high performance polymers such as, but not limited to, fuel or lube oil additives, network polymers, star-branched polymers, and graft and block co-polymers. Provided herein are telechelic polymers that have vinyl ether chain ends and methods for producing the same.

4. SUMMARY

In some embodiments, provided herein are methods for preparing a telechelic polymer comprising contacting a compound of formula I:

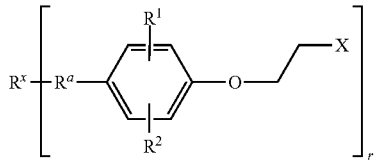

with a base, wherein:
$R^1$ and $R^2$ are each, independently, H, alkyl, or alkoxy;
$R^a$ is a polyisobutylene group;
$R^x$ is an initiator residue;
r is an integer from 1 to 4; and
X is a —Cl, —Br, —I, or —OC(O)R, wherein R is alkyl, alkenyl, alkynyl, alkaryl, aryl, or heteroaryl.

In some embodiments, the compound of formula I contacts with the base to form a compound of formula II:

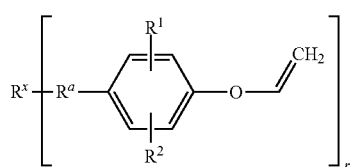

wherein
$R^1$ and $R^2$ are each, independently, H, alkyl, or alkoxy;
$R^a$ is a polyisobutylene group;
$R^x$ is an initiator residue; and
r is an integer from 1 to 4.

In some embodiments, provided herein are compounds having the formula II:

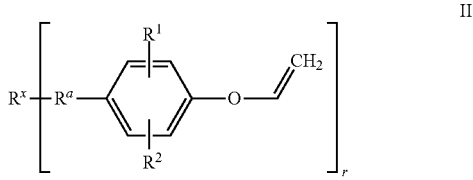

wherein:
$R^1$ and $R^2$ are each, independently, H, alkyl, or alkoxy;
$R^a$ is a polyisobutylene group;
$R^x$ is an initiator residue; and
r is an integer from 1 to 4.

5. BRIEF DESCRIPTION OF THE DRAWINGS

FIG. 1 is a $^1$H NMR spectrum of the reaction product of Example 1.

6. DETAILED DESCRIPTION (a) Definitions

Unless defined otherwise, all technical and scientific terms used herein have the same meaning as is commonly understood by one of ordinary skill in the art. In the event that there are a plurality of definitions for a term used herein, the definitions provided in this section prevail unless stated otherwise.

As used herein, "alkane" refers to a zero-valent hydrocarbon containing only single bonds. In some embodiments, the alkane contains a straight hydrocarbon chain. In some embodiments, the alkane contains a branched hydrocarbon chain. In some embodiments, the alkane is cyclic. In some embodiments, the alkane contains 1 to 10 carbons. In some embodiments, the alkane contains 1 to 8 carbons. In some embodiments, the alkane contains 1 to 6 carbons. In some embodiments, the alkane contains 1 to 3 carbons. In some embodiments, the alkane contains 1 to 2 carbons. In some embodiments, the alkane contains 5 to 6 carbons. In some embodiments, the alkane is pentane. In some embodiments, the alkane is hexane. In some embodiments, the alkane is substituted.

As used herein, "alkaryl" refers to a uni-valent aryl group substituted with at least one alkyl, alkenyl, or alkynyl group.

As used herein, "alkaryloxy" refers to a uni-valent group of formula —OR, wherein R is alkaryl.

As used herein, "alkenyl" refers to a uni-valent hydrocarbon chain or group of about 2 to about 20 carbons, wherein the chain or group contains one or more double bonds. In some embodiments, the alkenyl contains about 2 to about 15 carbons. In some embodiments, the alkenyl contains about 2 to about 10 carbons. In some embodiments, the alkenyl contains about 2 to about 8 carbons. In some embodiments, the alkenyl contains about 2 to about 6 carbons. In some embodiments, the alkenyl contains about 2 to about 3 carbons. In some embodiments, the alkenyl is an allyl group. In some embodiments, the alkenyl group contains one or more double bonds that are conjugated to another unsaturated group. In some embodiments, the alkenyl is substituted.

As used herein, "alkoxy" refers to —OR, wherein R is alkyl.

As used herein, "alkyl" refers to a uni-valent hydrocarbon chain or group of about 1 to about 20 carbons. In some embodiments, the alkyl contains about 1 to about 15 carbons. In some embodiments, the alkyl contains about 1 to about 10 carbons. In some embodiments, the alkyl contains about 1 to about 8 carbons. In some embodiments, the alkyl contains about 1 to about 6 carbons. In some embodiments, the alkyl contains about 1 to about 3 carbons. In some embodiments, the alkyl contains 1 to 2 carbons. In some embodiments, the alkyl is primary. In some embodiments, the alkyl is secondary. In some embodiments, the alkyl is tertiary. In some embodiments, the alkyl is methyl, ethyl, n-propyl, isopropyl, isobutyl, n-butyl, sec-butyl, tert-butyl, isopentyl, neopentyl, tert-pentyl, or isohexyl. In some embodiments, the alkyl is methyl, ethyl, n-propyl, or isopropyl. In some embodiments, the alkyl is methyl. In some embodiments, the alkyl is tert-butyl. In some embodiments, the alkyl is a straight hydrocarbon chain. In some embodiments, the alkyl is a branched hydrocarbon chain. In some embodiments, the alkyl is cyclic. In some embodiments, the alkyl is substituted.

As used herein, "alkynyl" refers to a uni-valent hydrocarbon chain or group of about 2 to about 20 carbons, wherein the chain contains one or more triple bonds. In some embodiments, the alkynyl contains about 2 to about 15 carbons. In some embodiments, the alkynyl contains about 2 to about 10 carbons. In some embodiments, the alkynyl contains about 2 to about 8 carbons. In some embodiments, the alkynyl contains about 2 to about 6 carbons. In some embodiments, the alkynyl contains about 2 to about 3 carbons. In some embodiments, the alkynyl is a propargyl group. In some embodiments, the alkynyl group contains one or more triple bonds that are conjugated to another unsaturated group. In some embodiments, the alkynyl is substituted.

As used herein, "amide" refers to a compound of the following formula:

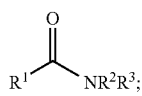

wherein $R^1$-$R^3$ are each, independently, hydrogen or optionally substituted hydrocarbyl. In some embodiments, $R^1$ is hydrogen. In some embodiments, $R^1$ is hydrocarbyl. In some embodiments, $R^2$ is hydrogen. In some embodiments, $R^2$ and $R^3$ are hydrocarbyl. In some embodiments, the amide is N,N-dimethylformamide.

As used herein, "aralkyl" refers to a uni-valent alkyl, alkenyl, or alkynyl group substituted with at least one aryl group.

As used herein, "aryl" refers to a uni-valent monocyclic or multicyclic aromatic group containing from 6 to about 30 carbons. In some embodiments, the aryl is monocyclic. In some embodiments, the aryl contains about 6 to about 15 carbons. In some embodiments, the aryl contains about 6 to about 10 carbons. In some embodiments, the aryl is fluorenyl, phenyl, or naphthyl. In some embodiments, the aryl is phenyl. In some embodiments, the aryl is substituted.

As used herein, "aryloxy" refers to a uni-valent group having the formula —OR, wherein R is aryl.

As used herein, "carbocation terminated polyolefin" refers to a polyolefin containing at least one carbocation end group. Examples include, but are not limited to, compounds of the formula:

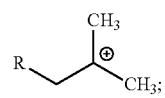

wherein R is a polyolefin group.

As used herein, "chain-end concentration" refers to the sum of the molar concentration of carbocationic end groups and dormant end groups. When a mono-functional initiator is used, the chain-end concentration is approximately equal to the initiator concentration. For a multi-functional initiator, when the functionality of the initiator equals x, then the chain end concentration is approximately equal to x times the initiator concentration.

As used herein, "common ion salt" refers to an ionic salt that is optionally added to a reaction performed under quasiliving carbocationic polymerization conditions to prevent dissociation of the propagating carbenium ion and counter-ion pairs.

As used herein, "common ion salt precursor" refers to an ionic salt that is optionally added to a reaction performed under quasiliving carbocationic polymerization conditions, wherein the ionic salt generates counter-anions that are identical to those of the propagating chain ends, via in situ reaction with a Lewis acid.

As used herein, "diluent" refers to a liquid diluting agent or compound. Diluents may be a single or a mixture of two or more compounds or agents. Diluents may completely dissolve or partially dissolve the reaction components.

As used herein, "electron donor" refers to a molecule that is capable of donating a pair of electrons to another molecule.

As used herein, "halo" refers to halogen. In some embodiments, halo is F, Cl, Br, or I. In some embodiments, halo is F. In some embodiments, halo is Cl. In some embodiments, halo is Br. In some embodiments, halo is I.

As used herein, "heteroaryl" refers to a uni-valent monocyclic or multicyclic aromatic ring system containing about 5 to about 15 ring atoms wherein at least one ring atom is a heteroatom. In some embodiments, the heteroaryl contains 5 to about 10 ring atoms. In some embodiments, the heteroaryl contains 5 or 6 ring atoms. In some embodiments, the heteroaryl is monocyclic. In some embodiments, the heteroatom is N, O, or S. In some embodiments, the heteroaryl contains one heteroatom. In some embodiments, the heteroaryl contains 1 to 3 N atoms. In some embodiments, the heteroaryl contains one O or S atom and one or two N atoms. In some embodiments, the heteroaryl is furyl, imidazolyl, pyrimidinyl, tetrazolyl, thienyl, pyridyl, pyrrolyl, thiazolyl, isothiazolyl, oxazolyl, isoxazolyl, thiazolyl, quinolinyl, or isoquinolinyl. In some embodiments, the heteroaryl is furyl. In some embodiments, the heteroaryl is substituted.

As used herein, "heteroaryloxy" refers to a uni-valent group of formula —OR, wherein R is heteroaryl.

As used herein, "hydrocarbyl" refers to a monovalent, linear, branched, or cyclic group which contains carbon and hydrogen atoms, and in certain embodiments, is substituted. In some embodiments, the hydrocarbyl is alkyl, alkenyl, alkynyl, aryl, alkaryl, or aralkyl, each optionally substituted. In some embodiments, the hydrocarbyl is substituted. In some embodiments, the hydrocarbyl is not substituted.

As used herein, "heterocyclyl" refers to a uni-valent monocyclic or multicyclic non-aromatic ring system containing about 3-30 ring atoms, wherein at least one ring atom is a heteroatom. In some embodiments, the heterocyclyl contains 5 to about 10 ring atoms. In some embodiments, the heterocyclyl contains 5 or 6 ring atoms. In some embodiments, the heteroatom is N, O, or S. In some embodiments, the heterocyclyl is monocyclic.

As used herein, "nitroalkane" refers to $RNO_2$, wherein R is hydrocarbyl. In some embodiments, R is alkyl.

As used herein, "inifer" refers to a compound that acts as both an initiator and a chain transfer agent. In some embodiments, the inifer is a binifer or trinifer. As used herein, "binifer" refers to an inifer that is capable of initiation and propagation at two separate sites of an inifer. In some embodiments, the initiation and propagation occur simultaneously or nearly simultaneously at the two sites. As used herein, "trinifer" refers to an inifer that is capable of initiation and propagation at three separate sites of an inifer. In some embodiments, the initiation and propagation occur simultaneously or nearly simultaneously at the three sites.

As used herein, "initiator" refers to a compound that provides one or more carbocations or their reactive equivalent. The initiator, in some embodiments, is a compound capable of providing one ore more carbocations to which a monomer may add during a carbocationic polymerization. Polymerization reactions, in some embodiments, are performed by first generating one or more carbocations from an initiator and subsequently contacting the one or more carbocations with one or more monomers that are capable of adding to a carbocation. An initiator may be a mono-functional initiator or a multi-functional initiator. As used herein, "mono-functional initiator" refers to an initiator that provides approximately one stoichiometric equivalent of carbocation relative to initiator. When a mono-functional initiator is used, the chain-end concentration is approximately equal to the initiator concentration. As used herein, "multi-functional initiator" refers to an initiator that provides approximately x stoichiometric equivalents of carbocation relative to initiator, wherein x represents the functionality of the initiator. When a multi-functional initiator is used, when the functionality of the initiator equals x, then the chain-end concentration equals x times the initiator concentration. In some embodiments, x is 2, and the initiator is a bi-functional initiator As used herein, "initiator residue" refers to a monovalent or polyvalent, i.e., divalent or greater, moiety that is bonded to a polymer. In some embodiments, the initiator residue is derived from an initiator, including for example, those initiators described herein. The initiator residue, in some embodiments, is the portion of an initiator that remains after forming one or more carbocations and that forms a bond to one or more monomers during a polymerization.

As used herein, "ionized polyolefin" refers to a polyolefin containing at least one carbenium ion. In some embodiments, the ionized polyolefin is derived through the ionization of a tert-halide terminated polyolefin or a polyolefin containing an olefin, including, for example, exo-terminated and endo-terminated polyolefins. In some embodiments, the ionized polyolefin is derived from an inifer.

As used herein, "Lewis acid" refers to a chemical entity that is capable of accepting a pair of electrons.

As used herein, "monomer" refers to an olefin that is capable of combining with a carbocation to form another carbocation.

As used herein, "polyisobutyl group" refers to a monovalent polyolefin group comprising at least 2 isobutylene monomer units. In some embodiments, the polyisobutyl group is

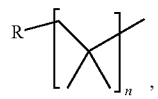

wherein R is H or alkyl of 1 to about 10 carbons, and n is an integer from about 10 to about 2000. In further embodiments, n is about 10 to about 1000. In further embodiments, n is about 10 to about 500. In further embodiments, n is about 10 to about 250. In further embodiments, n is about 10 to about 100. In further embodiments, n is about 10 to about 50.

As used herein, "polyisobutylene group" refers to a divalent polyolefin group comprising at least 2 isobutylene monomer units. In some embodiments, the polyisobutylene group is

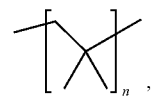

wherein n is an integer from about 5 to about 20,000. In further embodiments, n is about 10 to about 10,000. In further embodiment, n is about 10 to about 1,000. In further embodiments, n is about 10 to about 500. In further embodiments, n is about 10 to about 250. In further embodiments, n is about 10 to about 100. In further embodiments, n is about 50 to about 1,000. In further embodiments, n is about 10 to about 50. In some embodiments, n is at least 5, 10, 25, 50, 100, 250, or 500.

As used herein, "polyolefin" refers to a polymer that comprises at least two olefin monomer units. In some embodiments, the polyolefin has a molecular weight from about 300 to in excess of a million g/mol. In some embodiments, the polyolefin has a molecular weight of from about 200 to 10,000 g/mol. In some embodiments, the polyolefin has a molecular weight of from about 100,000 to 1,000,000 g/mol. In some embodiments, the polyolefin has a molecular weight greater than 200 g/mol. In some embodiments, the polyolefin has a molecular weight greater than 400 g/mol. In some embodiments, the polyolefin has a molecular weight greater than 600 g/mol. In some embodiments, the polyolefin has a molecular weight greater than 800 g/mol. In some embodiments, the polyolefin has a molecular weight greater than 1000 g/mol. In some embodiments, the polyolefin has a molecular weight greater than 5000 g/mol. In some embodiments, the polyolefin has a molecular weight greater than 10,000 g/mol. In some embodiments, the polyolefin has a molecular weight greater than 100,000 g/mol. In some embodiments, the polyolefin has a molecular weight greater than 500,000 g/mol. In some embodiments, the polyolefin has a molecular weight greater than 1,000,000 g/mol. In some embodiments, the polyolefin is derived from a mono-functional initiator, bi-functional initiator, or multi-functional initiator. In some embodiments, the polyolefin is polyisobutylene.

As used herein, "polyolefin group" refers to a polyolefin substituent. In some embodiments, the polyolefin group is a polyisobutyl group or a polyisobutylene group.

As used herein, "quasiliving carbocationic polyolefin" refers to a carbocationic polyolefin that has been formed under quasiliving carbocationic polymerization conditions.

As used herein, "quasiliving carbocationic polymerization conditions" refers to conditions that allow for quasiliving polymerizations, which are polymerizations that proceed with minimal irreversible chain termination and minimal chain transfer. Quasiliving polymerizations proceed by initiation followed by propagation, wherein propagating (active) species are in equilibrium with non-propagating (dormant) polymer chains.

As used herein, "substituted" refers to the presence of one or more substituents. In some embodiments, only one substituent is present.

As used herein, "telechelic polymer" refers to a polyolefin having a functionalized endgroup.

As used herein, "tert-halide terminated polyolefin" refers to a polyolefin that contains at least one tertiary halide end group. In some embodiments, the tert-halide terminated polyolefin has the following formula:

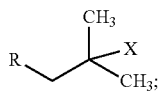

wherein R is a polyolefin group and X is halo. In some embodiments, the tert-halide terminated polyolefin has the following formula:

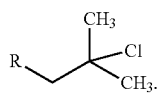

(b) Methods

Provided herein are methods for preparing a telechelic polymer comprising contacting a compound of formula I:

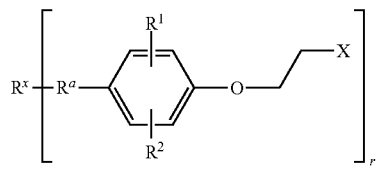

with a base, wherein:

R$^1$ and R$^2$ are each, independently, H, alkyl, or alkoxy;

R$^a$ is a polyisobutylene group;

R$^x$ is an initiator residue;

r is an integer from 1 to 4;

and X is a —Cl, —Br, —I, or —OC(O)R, wherein R alkyl, alkenyl, alkynyl, alkaryl, aryl, or heteroaryl.

In some embodiments, R$^1$ and R$^2$ are each, independently, H, alkyl of 1 to 6 carbons or alkoxy of 1 to 6 carbons. In some embodiments, R$^1$ and R$^2$ are each, independently, alkyl of 1 to 3 carbons or alkoxy of 1 to 3 carbons. In some embodiments, R$^1$ and R$^2$ are H. In some embodiments, at least one of R$^1$ and R$^2$ is H. In some embodiments, R$^1$ and R$^2$ is tert-butyl.

In some embodiments, r is an integer from 1 to 3. In some embodiments, r is 1 or 2. In some embodiments, r is 1.

In some embodiments, r is 1 and R$^x$ is

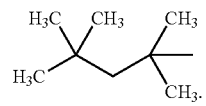

In some embodiments, r is 2 and R$^x$ is

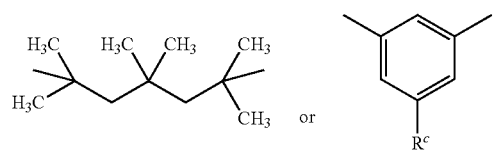

wherein R$^c$ is H or alkyl.

In some embodiments, Rx has the formula (—CR$_a$R$_b$)$_r$R$_c$, wherein R$_a$ and R$_b$ are each independently hydrogen, alkyl, aryl, alkaryl, or aralkyl, provided that at least one of R$_a$ and R$_b$ is not hydrogen, and R$_c$ is an aliphatic or aromatic univalent or polyvalent radical with valence r, wherein r is an integer from 1 to 4. In some embodiments, R$_c$ is hydrocarbyl. In some embodiments, R$_c$ is aryl. In some embodiments, R$_c$ is alkyl. In some embodiments, R$_c$ is phenyl. In some embodiments, r is 1. In some embodiments, r is 2. In some embodiments, r is 3. In some embodiments, r is 4.

In some embodiments, X is —Cl, —Br, —I, or —OC(O)R, wherein R alkyl. In further embodiments, R is alkyl of 1 to 6 or 1 to 3 carbons. In another embodiment, R is methyl. In some embodiments, X is —Cl, —Br, or —I. In some embodiments, X is —Cl.

In some embodiments, R$^a$ is

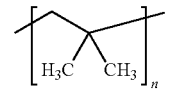

wherein n is an integer from 1 to 10,000.

In further embodiments, n is an integer from 10 to 10,000, from 50 to 10,000, 100 to 10,000, 500 to 10,000, or 1,000 to 10,000. In further embodiments, n is an integer from 10 to 5,000, 50 to 5,000, 100 to 5,000, or 500 to 5,000. In further embodiments, n is an integer from 10 to 1,000, 50 to 1,000, 100 to 1,000, or 500 to 1,000.

(i) Products

Provided herein are also the product or products of the methods described herein.

In some embodiments, the compound of formula I contacts with the base to form a compound of formula II:

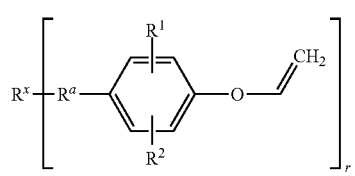

wherein
R$^1$ and R$^2$ are each, independently, H, alkyl, or alkoxy;
R$^a$ is a polyisobutylene group; and
R$^x$ is an initiator residue.

In some embodiments, $R^1$ and $R^2$ are each, independently, H, alkyl of 1 to 6 carbons or alkoxy of 1 to 6 carbons. In some embodiments, $R^1$ and $R^2$ are each, independently, alkyl of 1 to 3 carbons or alkoxy of 1 to 3 carbons. In some embodiments, $R^1$ and $R^2$ are H. In some embodiments, at least one of $R^1$ and $R^2$ is H. In some embodiments, $R^1$ and $R^2$ is tert-butyl.

In some embodiments, r is an integer from 1 to 3. In some embodiments, r is 1 or 2. In some embodiments, r is 1.

In some embodiments, r is 1 and $R^x$ is

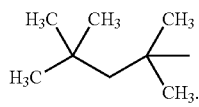

In some embodiments, r is 2 and $R^x$ is

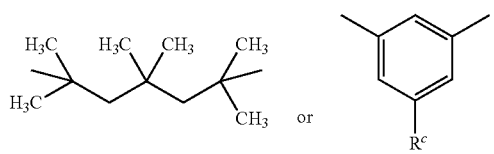

wherein $R^c$ is H or alkyl.

In some embodiments, Rx has the formula $(-CR_aR_b)_rR_c$, wherein $R_a$ and $R_b$ are each independently hydrogen, alkyl, aryl, alkaryl, or aralkyl, provided that at least one of $R_a$ and $R_b$ is not hydrogen, and $R_c$ is an aliphatic or aromatic univalent or polyvalent radical with valence r, wherein n is an integer from 1 to 4. In some embodiments, $R_c$ is hydrocarbyl. In some embodiments, $R_c$ is aryl. In some embodiments, $R_c$ is alkyl. In some embodiments, $R_c$ is phenyl. In some embodiments, r is 1. In some embodiments, r is 2. In some embodiments, r is 3. In some embodiments, r is 4.

In some embodiments, $R^a$ is

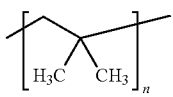

wherein n is an integer from 1 to 10,000.

In further embodiments, n is an integer from 10 to 10,000, from 50 to 10,000, 100 to 10,000, 500 to 10,000, or 1,000 to 10,000. In further embodiments, n is an integer from 10 to 5,000, 50 to 5,000, 100 to 5,000, or 500 to 5,000. In further embodiments, n is an integer from 10 to 1,000, 50 to 1,000, 100 to 1,000, or 500 to 1,000.

(ii) Bases

In the methods described herein, the compound of formula I contacts with a base. In some embodiments, the compound of formula I contacts with the base to form a compound of formula II. In further embodiments, the compound of formula I reacts with the base to form a compound of formula II. Without being limited to any theory, in some embodiments, the base abstracts a proton that is in the beta position with respect to X of formula I, thereby resulting in elimination of the X group to form a double bond.

In some embodiments, the base provides hydroxide or alkoxide ions. In some embodiments, the base is a metal hydroxide or metal alkoxide. Examples include the hydroxide or alkoxide of K, Ba, Cs, Na, Sr, Ca, Li, Rb, or Mg. In some embodiments, the base is a metal alkoxide. In some embodiments, the base is an alkali metal hydroxide or alkali metal alkoxide. In some embodiments, the base is a sterically hindered base.

In some embodiments, the base is an alkoxide of formula —OR, wherein R is alkyl. In some embodiments, the alkyl has 1, 2, 3, 4, 5, 6, 7, 8, 9, 10, 11, or 12 carbons. In some embodiments, the O is bonded to R on a secondary or tertiary carbon. In some embodiments, the alkoxide is tert-butoxide.

In some embodiments, the base is a metal amide, including, but not limited to metal alkyl amides. In some embodiments, the base is lithium diisopropylamide or lithium diethylamide. In some embodiments, the base is a metal carbanion.

(iii) Reaction Conditions

In some embodiments, the method is performed in the presence of a diluent. In some embodiments of the methods described herein, the methods are performed in a diluent. In some embodiments, the diluent is a single compound or a mixture of two or more compounds. In some embodiments, the diluent completely dissolves the reaction components or partially dissolves the reaction components. In some embodiments, the diluent completely or nearly completely dissolves the reaction components. In some embodiments, the diluent completely dissolves the reaction components. In some embodiments, the diluent nearly completely dissolves the reaction components.

In some embodiments, the diluent has a low boiling point and/or low freezing point. In some embodiments, the diluent is an alkane. In some embodiments, the diluent is a normal alkane. In some embodiments, the diluent is propane, normal butane, normal pentane, normal hexane, normal heptane, normal octane, normal nonane or normal decane. In some embodiments, the diluent is normal hexane or normal pentane. In some embodiments, the diluent is normal hexane. In some embodiments, the diluent is heptane. In some embodiments, the diluent is a branched alkane. In some embodiments, the alkane is isobutane, isopentane, neopentane, isohexane, 3-methylpentane, 2,2-dimethylbutane, or 2,3-dimethylbutane. In some embodiments, the alkane is cyclic. In some embodiments, the alkane is methylcyclohexane. In some embodiments, the diluent is a mixed boiling fraction alkane. In some embodiments, the diluent is a mixed boiling fraction of C5 alkanes, i.e., mixed pentanes, or mixed boiling fraction of C6 alkanes, i.e., mixed hexanes. In some embodiments, the alkane is a nitroalkane.

In some embodiments, the diluent is an alkyl halide. In some embodiments, the diluent is an alkyl monohalide or an alkyl polyhalide. In some embodiments, the diluent is chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, iso-propyl chloride, 1,2-dichloropropane, or 1,3-dichloropropane. In some embodiments, the diluent is methylene chloride or methyl chloride. In some embodiments, the diluent is methyl chloride. In some embodiments, the diluent is an alkene or halogenated alkene. In some embodiments, the diluent is vinyl chloride, 1,1-dichloroethene, or 1,2-dichloroethene.

In some embodiments, the diluent is a substituted benzene. In some embodiments, the diluent is benzene. In some embodiments, the diluent is toluene.

In some embodiments, the diluent is carbon disulfide, sulfur dioxide, acetic anhydride, acetonitrile, benzene, toluene, ethylbenzene, methylcyclohexane, chlorobenzene, a nitroalkane, or N,N-dimethylformamide.

In some embodiments, the diluent is a mixture of two or more compounds. In some embodiments, the diluent is a mixture of heptane and N—N-dimethylformamide.

In some embodiments, the method is performed at a temperature of about 20 to 200° C. In some embodiments, the method is performed at a temperature of about 20 to 150° C. In some embodiments, the method is performed at a temperature of about 50 to 120° C. In some embodiments, the method is performed at a temperature of about 70 to 120° C. In some embodiments, the method is performed at the temperature of reflux of the diluent or diluent mixture.

In some embodiments, the compound of formula I, when contacted with the base, reacts with the base.

In some embodiments, the method is performed for 30 minutes, 45 minutes, 60 minutes, or 90 minutes. In some embodiments, the method is performed for 2, 3, 4, 5, 6, 7, 8, 9, 10, 11, or 12 hours. In some embodiments, the method is performed for 24 hours.

In some embodiments, certain combinations of diluent mixtures and reaction temperatures may be employed to facilitate both the formation and isolation of the desired telechelic polymer product. In some embodiments, diluent mixtures of two or more solvents are employed, wherein the solvents are capable of (1) providing a biphasic solvent mixture at a particular temperature and (2) coalescing into a monophasic solvent mixture at a second, e.g., higher, temperature. In certain embodiments, such diluent mixtures comprise an aprotic dipolar solvent and a non-polar solvent. In certain embodiments, the aprotic dipolar solvent is capable of dissolving the base and/or salt by-products of the methods described herein, and the non-polar solvent is capable of dissolving the telechelic polymer product. In certain embodiments, the non-polar solvent has a high boiling point. In certain embodiments, the non-polar solvent is immiscible with the dipolar solvent at room temperature but miscible with it at a higher temperature. In certain embodiments, the methods described herein are performed in a diluent mixture comprising an aprotic dipolar solvent and a non-polar solvent at a temperature sufficient to render the diluent mixture monophasic. In certain embodiments, the reaction is subsequently cooled to allow formation of a biphasic mixture, wherein one phase is the aprotic dipolar solvent and the other phase is the non-polar solvent. In certain embodiments, the majority of the desired telechelic polyolefin product by weight will be dissolved in the non-polar solvent, and the majority of the base and/or salt by-products by weight will be dissolved in the aprotic dipolar solvent.

In some embodiments, the compound of formula I is contacted with the base in a diluent mixture comprising an aprotic dipolar solvent and a non-polar solvent. In certain embodiments, this is performed at a temperature sufficient to render the diluent mixture monophasic. In certain embodiments, the reaction is subsequently cooled to a temperature sufficient to render the diluent mixture biphasic.

In some embodiments, the aprotic dipolar solvent is N,N-dimethylformamide (DMF), N,N-dimethylacetamide (DMAc), dimethyl sulfoxide (DMSO), hexamethylphosphorotriamide (HMPT). In some embodiments, the aprotic dipolar solvent is N,N-dimethylformamide.

In some embodiments, the non-polar solvent is a C5-C12 alkane. In some embodiments, the non-polar solvent is a heptane, a hexane, an octane, or a nonane. In some embodiments, the non-polar solvent is a heptane.

In certain embodiments, the diluent mixture comprises a heptane and N,N-dimethylformamide.

(iv) Synthesis of Compounds of Formula III

In some embodiments, the compound of formula I is formed by
(a) providing a carbocationic polyolefin; and
(b) contacting the carbocationic polyolefin from step (a) with one or more compounds of formula III:

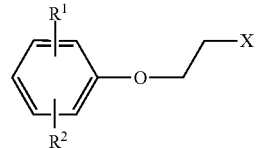

III wherein $R^1$ and $R^2$ are each, independently, H, alkyl, or alkoxy; and

X is a —Cl, —Br, —I, or —OC(O)R, wherein R alkyl, alkenyl, alkynyl, alkaryl, aryl, or heteroaryl.

In some embodiments, the carbocationic polyolefin of step (a) reacts with the one or more compounds of formula III.

In some embodiments, the carbocationic polyolefin of step (a) is a quasiliving carbocationic polyolefin.

In another embodiment, the compound of formula I is formed by
(a) generating a quasiliving carbocationic polyolefin; and
(b) contacting the quasiliving carbocationic polyolefin from step (a) with one or more compounds of formula III in the presence of a Lewis acid or mixture of Lewis acids under quasiliving carbocationic polymerization conditions:

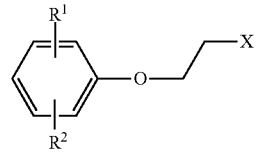

III wherein $R^1$ and $R^2$ are each, independently, H, alkyl, or alkoxy; and

X is a —Cl, —Br, —I, or —OC(O)R, wherein R alkyl, alkenyl, alkynyl, alkaryl, aryl, or heteroaryl.

In some embodiments, the quasiliving carbocationic polyolefin of step (a) reacts with the one or more compounds of formula III.

In some embodiments, $R^1$ and $R^2$ are each, independently, H, alkyl of 1 to 6 carbons or alkoxy of 1 to 6 carbons. In some embodiments, $R^1$ and $R^2$ are each, independently, alkyl of 1 to 3 carbons or alkoxy of 1 to 3 carbons. In some embodiments, $R^1$ and $R^2$ are H. In some embodiments, at least one of $R^1$ and $R^2$ is H. In some embodiments, $R^1$ and $R^2$ is tert-butyl.

In some embodiments, X is —Cl, —Br, —I, or —OC(O)R, wherein R alkyl. In further embodiments, R is alkyl of 1 to 6 or 1 to 3 carbons. In another embodiment, R is methyl. In some embodiments, X is —Cl, —Br, or —I. In some embodiments, X is —Cl.

(A) Ionized Polyolefins

Ionized polyolefins may be made by any method known to those of skill in the art. Examples include, but are not limited to, ionizing a tert-halide terminated polyolefin with a Lewis acid under quasiliving conditions; ionizing a preformed polyolefin containing terminal unsaturation with a Lewis acid in the presence of a proton source under quasiliving conditions;

polymerizing an olefin monomer under quasiliving carbocationic polymerization conditions; or performing the "inifer" polymerization method.

In some embodiments, the ionized polyolefin is a carbocationic polyolefin. In some embodiments, the carbocationic polyolefin is a carbocation terminated polyolefin. In some embodiments, the carbocationic polyolefin contains one or more carbocation end groups. In some embodiments, the carbocationic polyolefin contains one carbocation end group. In some embodiments, the carbocationic polyolefin contains two carbocation end groups. In some embodiments, the carbocationic polyolefin contains three carbocation end groups. In some embodiments, the carbocationic polyolefin is a polyisobutyl with a cationic end group. In some embodiments, the carbocationic polyolefin is a compound of the following formula:

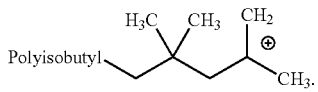

(1) Ionized Polyolefins from Tert-Halides Under Quasiliving Conditions

In some embodiments, the ionized carbocationic polyolefin is derived from a tert-halide terminated polyolefin under quasiliving conditions. In some embodiments, the ionized polyolefin is derived form a tert-chloride terminated polyolefin, tert-bromide terminated polyolefin, or tert-iodide terminated polyolefin under quasiliving conditions. In some embodiments, the ionized polyolefin is derived from a tert-chloride terminated polyolefin or tert-bromide terminated polyolefin under quasiliving conditions. In some embodiments, the ionized polyolefin is derived from a tert-chloride polyolefin under quasiliving conditions.

Tert-halide terminated polyolefins may be made by any method known to those of skill in the art.

In some embodiments, the ionized polyolefin is generated by contacting a tert-halide terminated polyolefin with a Lewis acid under quasiliving conditions. In some embodiments, the ionized polyolefin is generated by contacting a tert-chloride terminated polyolefin, tert-bromide terminated polyolefin, or tert-iodide terminated polyolefin with a Lewis acid under quasiliving conditions. In some embodiments, the ionized polyolefin is generated by contacting a tert-chloride terminated polyolefin with a Lewis acid under quasiliving conditions.

In some embodiments, the tert-halide terminated polyolefin is derived from an inifer.

(2) Ionized Polyolefins from Preformed Polyolefins Under Quasiliving Conditions

In some embodiments, the ionized polyolefin is derived from a preformed polyolefin under quasiliving conditions. In some embodiments, the preformed polyolefin contains one or more double bonds. In some embodiments, the preformed polyolefin contains one double bond. In some embodiments, the preformed polyolefin is a polyisobutylene derivative. In some embodiments, the preformed polyolefin contains one or more endo olefins.

In some embodiments, the ionized polyolefin is generated by contacting a Lewis acid with a preformed polyolefin in the presence of a proton source under quasiliving conditions. In some embodiments, the ionized polyolefin is generated by contacting a preformed polyolefin containing one or more double bonds with a Lewis acid in the presence of a proton source under quasiliving conditions. In some embodiments, the ionized polyolefin is generated by contacting a preformed polyolefin containing one double bond with a Lewis acid in the presence of a proton source under quasiliving conditions. In some embodiments, the ionized polyolefin is generated by contacting a polyisobutylene derivative with a Lewis acid in the presence of a proton source under quasiliving conditions. In some embodiments, the ionized polyolefin is generated by contacting a preformed polyolefin containing one or more endo and/or exo olefins with a Lewis acid in the presence of a proton source under quasiliving conditions.

(3) Ionized Polyolefins from the Inifer Method

In some embodiments, the ionized polyolefin is derived from an inifer using methods known to those of ordinary skill in the art. Non-limiting examples of such methods are described in U.S. Pat. Nos. 4,276,394 and 4,568,732, each of which is incorporated by reference herein. In some embodiments, a monomer is reacted with an inifer carrying at least two tertiary halogens under cationic polymerization conditions.

Non-limiting examples of inifers suitable for use in the methods described herein are those inifers disclosed in U.S. Pat. Nos. 4,276,394 and 4,568,732, each of which is incorporated by reference herein. In some embodiments, the inifer is a binifer or a trinifer. In some embodiments, the inifer is a binifer. In some embodiments, the inifer is a trinifer. In some embodiments, the inifer is tricumyl chloride, p-dicumyl chloride, m-dicumyl chloride, 1,3-di(2-chloro-2-propyl)-5-tert-butylbenzene, or tricumyl bromide.

(4) Ionized Polyolefins from Olefinic Monomers Under Quasiliving Carbocationic Polymerization Conditions In some embodiments, the ionized polyolefin is derived from olefinic monomers under quasiliving carbocationic polymerization conditions. Under such conditions, a quasiliving carbocationic polyolefin is generated. Such conditions may be achieved by any method known to those of skill in the art. Non-limiting examples of such methods are described in EP 206756 B1 and WO 2006/110647 A1, both of which are incorporated by reference herein.

In some embodiments, a monomer, an initiator, and a Lewis acid are used. In some embodiments, an electron donor, common ion salt, and/or common ion salt precursor is/are used. In some embodiments, the ionized polyolefin is a quasiliving carbocationic polyisobutylene of the following formula:

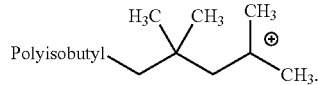

Some non-limiting examples of reagents and conditions suitable for polymerizations producing quasiliving polyolefins will be described below.

a) Initiators

In some embodiments, the initiator is a compound or polyolefin with one, or more than one, end group capable of initiating a cationic olefin polymerization. For example, the initiator can be a compound of formula $(X^1-CR_aR_b)_nR_c$ wherein $R_a$ and $R_b$ are independently hydrogen, alkyl, aryl, alkaryl, or aralkyl, provided that at least one of $R_a$ or $R_b$ is not hydrogen; and $R_c$ is an aliphatic or aromatic univalent or polyvalent radical with valence n, wherein n is an integer from one to 4. $X^1$ is an acetate, alkoxy, hydroxyl group, or a halogen. In some embodiments, $R_a$, $R_b$ and $R_c$ are hydrocarbon groups containing one carbon atom to about 20 carbon atoms. In some embodiments, $R_a$, $R_b$ and $R_c$ are hydrocarbyl groups containing one carbon atom to about 8 carbon atoms. In some embodiments, X' is a halogen. In some embodiments, X' is chloride. In some embodiments, the structure of $R_a$, $R_b$ and $R_c$ mimics the growing species or monomer. In some embodiments, such structure is a 1-halo, 1-phenylethane initiator for polystyrene or a 2-halo-2,4,4-trimethylpentane initiator for polyisobutylene. In some embodiments, $R_a$, $R_b$ and $R_c$ are each hydrocarbon groups containing one carbon atom to about 8 carbon atoms for the initiation of an isobutylene polymerization. In some embodiments, the initiator is a cumyl, dicumyl or tricumyl halide.

Some exemplary initiators include 2-chloro-2-phenylpropane, i.e., cumyl chloride; 1,4-di(2-chloro-2-propyl)benzene, i.e., p-dicumylchloride; 1,3,5-tri(2-chloro-2-propyl)benzene, i.e., tricumylchloride; 2-acetoxy-2-phenylpropane, i.e., cumyl acetate; 2-propionyloxy-2-phenyl propane, i.e., cumyl propionate; 2-methoxy-2-phenylpropane, i.e., cumylmethyl ether; 1,4-di(2-methoxy-2-propyl)benzene, i.e., p-dicumylmethoxide; 1,3,5-tri(2-methoxy-2-propyl)benzene, i.e., tricumylmethoxide; 2-chloro-2,4,4-trimethyl pentane (TMPCl); 1,3-di(2-chloro-2-propyl)benzene; 2,6-dichloro-2,4,4,6-tetramethylheptane; and 1,3,-di(2-chloro-2-propyl)-5-tert-butylbenzene (bDCC).

In some embodiments, the initiator is mono-functional, bi-functional, or multi-functional.

In some embodiments, the mono-functional initiator is 2-chloro-2-phenylpropane, 2-acetoxy-2-phenylpropane, 2-propionyloxy-2-phenylpropane, 2-methoxy-2-phenylpropane, 2-ethoxy-2-phenylpropane, 2-acetoxy-2,4,4,-trimethylpentane, 2-propionyloxy-2,4,4-trimethylpentane, 2-methoxy-2,4,4-trimethylpentane, 2-ethoxy-2,4,4-trimethylpentane, or 2-chloro-2,4,4-trimethylpentane. In some embodiments, the initiator is 2-chloro-2,4,4-trimethylpentane.

In some embodiments, the bi-functional initiator is 1,3-di(2-chloro-2-propyl)benzene, 1,3-di(2-methoxy-2-propyl)benzene, 1,4-di(2-chloro-2-propyl)benzene, 1,4-di(2-methoxy-2-propyl)benzene, 1,3-di(2-chloro-2-propyl)-5-tert-butylbenzene, 1,3-di(2-methoxy-2-propyl)-5-tert-butylbenzene, 2,6-dichloro-2,4,4,6-tetramethylheptane, or 2,6-dimethoxy-2,4,4,6-tetramethylheptane. In some embodiments, the initiator is 1,3-di(2-chloro-2-propyl)-5-tert-butylbenzene or 2,6-dichloro-2,4,4,6-tetramethylheptane. In some embodiments, the initiator is 1,3-di(2-chloro-2-propyl)-5-tert-butylbenzene.

In some embodiments, the multi-functional initiator is 1,3,5-tri(2-chloro-2-propyl)benzene, 1,3,5-tri(2-bromo-2-propyl)benzene, or 1,3,5-tri(2-methoxy-2-propyl)benzene.

b) Monomers

In some embodiments, the monomer is a hydrocarbon monomer, i.e., a compound containing only hydrogen and carbon atoms, including but not limited to, olefins and diolefins, and those having from about 2 to about 20 carbon atoms. In some embodiments, such compounds have from about 4 to about 8 carbon atoms.

In some embodiments, the methods described herein can be employed for the polymerization of such monomers to produce polymers of different, but uniform molecular weights. In some embodiments, such molecular weight is from about 300 to in excess of a million g/mol. In some embodiments, such polymers are low molecular weight liquid or viscous polymers having a molecular weight of from about 200 to 10,000 g/mol, or solid waxy to plastic, or elastomeric materials having molecular weights of from about 100,000 to 1,000,000 g/mol, or more.

In some embodiments, the monomer is isobutylene, styrene, beta pinene, isoprene, butadiene, or substituted compounds of the preceding types. In some embodiments, the monomer is isobutylene, 2-methyl-1-butene, 3-methyl-1-butene, 4-methyl-1-pentene, or styrene. In some embodiments, the monomer is isobutylene.

In some embodiments, mixtures of monomers are used.

c) Lewis Acids

In some embodiments, the Lewis acid is a non-protic acid. In some embodiments, the Lewis acid is a metal halide or non-metal halide. In some embodiments, the Lewis acid is a metal halide. In some embodiments, the Lewis acid is a titanium (IV) halide, a zinc (II) halide, a tin (IV) halide, or an aluminum (III) halide. In some embodiments, the Lewis acid is a titanium (IV) halide. In some embodiments, the Lewis acid is a tin (IV) halide. In some embodiments, the Lewis acid is an aluminum (III) halide. In some embodiments, the Lewis acid is titanium tetrabromide or titanium tetrachloride. In some embodiments, the Lewis acid is titanium tetrachloride. In some embodiments, the Lewis acid is zinc chloride. In some embodiments, the Lewis acid is $AlBr_3$. In some embodiments, the Lewis acid is ethyl aluminum dichloride. In some embodiments the Lewis acid is a non-metal halide. In some embodiments, the Lewis acid is an antimony (V) halide, a gallium (III) halide, or a boron (III) halide. In some embodiments, the Lewis acid is boron trichloride. In some embodiments, the Lewis acid is a trialkyl aluminum compound. In some embodiments, the Lewis acid is trimethyl aluminum.

In some embodiments, one Lewis acid is used. In some embodiments, a mixture of two or more Lewis acids is used. In some embodiments, a mixture of two Lewis acids is used. In some embodiments, a mixture of an aluminum (III) halide and trialkyl aluminum compound is used. In some embodiments, a stoichiometric ratio of about 1:1 aluminum (III) halide to trialkyl aluminum compound is used. In some embodiments, a stoichiometric ratio of 2:1 aluminum (III) halide to trialkyl aluminum compound is used. In some embodiments, a stoichiometric ratio of 1:2 aluminum (III) halide to trialkyl aluminum is used. In some embodiments, the stoichiometric ratio of aluminum (III) halide to trialkyl aluminum is greater than 1. In some embodiments, the stoichiometric ratio of aluminum (III) halide to trialkyl aluminum is less than 1. In some embodiments, a mixture of aluminum tribromide and trimethyl aluminum is used.

In some embodiments, the Lewis acid is an alkyl aluminum halide. In some embodiments, the Lewis acid is a methyl aluminum bromide.

In some embodiments, the Lewis acid is added in one aliquot. In some embodiments, the Lewis acid is added in more than one aliquot. In some embodiments, the Lewis acid is added in two aliquots. In some embodiments, a first aliquot of Lewis acid is added during the polymerization reaction, and a second aliquot of Lewis acid is added after the addition of the compounds of formula I.

d) Electron Donors

As is understood to one of ordinary skill in the art, some electron donors are capable of converting traditional polymerization systems into quasiliving carbocationic polymerization systems. In some embodiments, the methods described herein are performed in the presence of an electron donor.

In some embodiments, the electron donor is capable of complexing with Lewis acids. In some embodiments, the electron donor is a base and/or nucleophile. In some embodiments, the electron donor is capable of abstracting or removing a proton. In some embodiments, the electron donor is an organic base. In some embodiments, the electron donor is an amide. In some embodiments, the electron donor is N,N-dimethylformamide, N,N-dimethylacetamide, or N,N-diethylacetamide. In some embodiments, the electron donor is a sulfoxide. In some embodiments, the electron donor is dimethyl sulfoxide. In some embodiments, the electron donor is an ester. In some embodiments, the electron donor is methyl acetate or ethyl acetate. In some embodiments, the electron donor is a phosphate compound. In some embodiments, the electron donor is trimethyl phosphate, tributyl phosphate, or triamide hexamethylphosphate. In some embodiments, the electron donor is an oxygen-containing metal compound. In some embodiments, the electron donor is tetraisopropyl titanate.

In some embodiments, the electron donor is pyridine or a pyridine derivative. In some embodiments, the electron donor is a compound of formula:

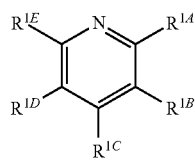

wherein $R^{1A}$, $R^{1B}$, $R^{1C}$, $R^{1D}$, and $R^{1E}$ are each independently, hydrogen or hydrocarbyl; or $R^{1A}$ and $R^{1B}$, or $R^{1B}$ and $R^{1C}$, or $R^{1C}$ and $R^{1D}$, or $R^{1D}$ and $R^{1E}$ independently form a fused aliphatic ring of about 3 to about 7 carbon atoms or a fused aromatic ring of about 5 to about 7 carbon atoms. In some embodiments, $R^{1A}$ and $R^{1E}$ are each, independently, hydrocarbyl, and $R^{1B}$-$R^{1D}$ are hydrogen.

In some embodiments, the electron donor is 2,6-di-tert-butylpyridine, 2,6-lutidine, 2,4-lutidine, 2,4,6-trimethylpyridine, 2-methylpyridine, or pyridine. In some embodiments, the electron donor is N,N-dimethylaniline or N,N-dimethyltoluidine. In some embodiments, the electron donor is 2,6-lutidine.

e) Common Ion Salts and Ion Salt Precursors

In some embodiments, common ion salts or salt precursors may be optionally added to the reaction mixture in addition to or in replacement of the electron donor. In some embodiments, such salts may be used to increase the ionic strength, and suppress free ions. In some embodiments, the common ion salt precursor is tetra-n-butylammonium chloride. In some embodiments, the common ion salt precursor is tetra-n-butylammonium bromide. In some embodiments, the common ion salt precursor is tetra-n-butylammonium iodide. In some embodiments, the concentration of the common ion salts or salt precursors in the total reaction mixture may be in the range from about 0.0005 moles per liter to about 0.05 moles per liter. In some embodiments, the concentration of the common ion salts or salt precursors is in the range from about 0.0005 moles per liter to about 0.025 moles per liter. In some embodiments, the concentration of the common ion salt or salt precursors is in the range from about 0.001 moles per liter to about 0.007 moles per liter.

f) Diluents

In some embodiments, the quasiliving polymerization is performed in the presence of a diluent. In some embodiments, the diluent is a single compound or a mixture of two or more compounds. In some embodiments, the diluent completely dissolves the reaction components or partially dissolves the reaction components. In some embodiments, the diluent completely or nearly completely dissolves the reaction components. In some embodiments, the diluent completely dissolves the reaction components. In some embodiments, the diluent nearly completely dissolves the reaction components.

In some embodiments, the diluent has a low boiling point and/or low freezing point. In some embodiments, the diluent is an alkane. In some embodiments, the diluent is a normal alkane. In some embodiments, the diluent is propane, normal butane, normal pentane, normal hexane, normal heptane, normal octane, normal nonane or normal decane. In some embodiments, the diluent is normal hexane or normal pentane. In some embodiments, the diluent is normal hexane. In some embodiments, the diluent is heptane. In some embodiments, the diluent is a branched alkane. In some embodiments, the alkane is isobutane, isopentane, neopentane, isohexane, 3-methylpentane, 2,2-dimethylbutane, or 2,3-dimethylbutane. In some embodiments, the alkane is cyclic. In some embodiments, the alkane is methylcyclohexane. In some embodiments, the diluent is a mixed boiling fraction alkane. In some embodiments, the diluent is a mixed boiling fraction of C5 alkanes, i.e., mixed pentanes, or mixed boiling fraction of C6 alkanes, i.e., mixed hexanes. In some embodiments, the alkane is a nitroalkane.

In some embodiments, the diluent is an alkyl halide. In some embodiments, the diluent is an alkyl monohalide or an alkyl polyhalide. In some embodiments, the diluent is chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, isopropyl chloride, 1,2-dichloropropane, or 1,3-dichloropropane. In some embodiments, the diluent is methylene chloride or methyl chloride. In some embodiments, the diluent is methyl chloride. In some embodiments, the diluent is an alkene or halogenated alkene. In some embodiments, the diluent is vinyl chloride, 1,1-dichloroethene, or 1,2-dichloroethene.

In some embodiments, the diluent is a substituted benzene. In some embodiments, the diluent is benzene. In some embodiments, the diluent is toluene.

In some embodiments, the diluent is carbon disulfide, sulfur dioxide, acetic anhydride, acetonitrile, benzene, toluene, ethylbenzene, methylcyclohexane, chlorobenzene, a nitroalkane, or N,N-dimethylformamide.

In some embodiments, the diluent is a mixture of two or more compounds. In some embodiments, the diluent is a mixture of hexane and methyl chloride. In further embodiments, such mixture is from about 10/90 to about 90/10 hexane/methyl chloride by volume. In further embodiments, such mixture is from about 20/80 to about 80/20 hexane/methyl chloride by volume. In further embodiments, such mixture is from about 30/70 to about 70/30 hexane/methyl chloride by volume. In further embodiments, such mixture is from about 40/60 to about 60/40 hexane/methyl chloride by volume. In further embodiments, such mixture is about 50/50 hexane/methyl chloride by volume. In further embodiments, such mixture is about 60/40 hexane/methyl chloride by volume. In further embodiments, such mixture is about 40/60 hexane/methyl chloride by volume.

g) Quasiliving Polymerization Temperature

In some embodiments, the quasiliving polymerization is performed at a temperature from about −120° C. to about 0° C. In some embodiments, the methods described herein are performed at a temperature from about −110° C. to about −10° C. In some embodiments, the methods described herein are performed at a temperature from about −100° C. to about −20° C. In some embodiments, the methods described herein are performed at a temperature from about −90° C. to about −30° C. In some embodiments, the methods described herein are performed at a temperature from about −80° C. to about −40° C. In some embodiments, the methods described herein are performed at a temperature from about −70° C. to about −40° C. In some embodiments, the methods described herein are performed at a temperature from about −60° C. to about −40° C. In some embodiments, the methods described herein are performed at a temperature of about −40° C., −50° C., −60° C., −70° C., or −80° C. In some embodiments, the methods described herein are performed at a temperature of about −40° C. In some embodiments, the methods described herein are performed at a temperature of about −50° C. In some embodiments, the methods described herein are performed at a temperature of about −60° C. In some embodiments, the methods described herein are performed at a temperature of about −70° C. In some embodiments, the methods described herein are performed at a temperature of about −80° C.

h) Concentrations

The chain end concentration of the methods described herein are not limited by the disclosed examples. The chain end concentration for the methods described herein appears to have no definite upper limit, and the methods described herein may be performed at any chain end concentration, subject to the inherent limits imposed by the density and molecular weight (i.e., molar volume) of the reaction components.

In some embodiments, the molar concentration of the compounds of formula I is from about 1 to about 10 times the molar concentration of chain ends. In some embodiments, the molar concentration of the compounds of formula I is from about 1.1 to about 8 times the molar concentration of chain ends. In some embodiments, the molar concentration of the compounds of formula I is from about 1.1 to about 5 times the molar concentration of chain ends. In some embodiments, the molar concentration of the compounds of formula I is from about 1.1 to about 4 times the molar concentration of chain ends. In some embodiments, the molar concentration of the compounds of formula I is from about 1.1 to about 3 times the molar concentration of chain ends. In some embodiments, the molar concentration of the compounds of formula I is from about 1.1 to about 2 times the molar concentration of chain ends.

In some embodiments, the molar concentration of Lewis acid is from about 0.5 to about 20 times the molar concentration of chain ends. In some embodiments, the molar concentration of Lewis acid is from about 0.5 to about 15 times the molar concentration of chain ends. In some embodiments, the molar concentration of Lewis acid is from about 1.0 to about 10 times the molar concentration of chain ends. In some embodiments, the molar concentration of Lewis acid is from about 1.0 to about 8 times the molar concentration of chain ends. In some embodiments, the molar concentration of Lewis acid is from about 2 to about 5 times the molar concentration of chain ends.

In some embodiments, the electron donor concentration is less than half the concentration of Lewis acid. In some embodiments, the electron donor concentration is less than 0.4 times the Lewis acid concentration. In some embodiments, the electron donor concentration is less than 0.3 times the Lewis acid concentration. In some embodiments, the electron donor concentration is less than 0.2 times the Lewis acid concentration. In some embodiments, the electron donor concentration is less than 0.1 times the Lewis acid concentration.

In some embodiments, the chain end concentration is less than 0.010 M. In some embodiments, the chain end concentration is less than 0.050 M. In some embodiments, the chain end concentration is less than 0.10 M. In some embodiments, the chain end concentration is less than 0.5 M. In some embodiments, the chain end concentration is less than 1.0 M. In some embodiments, the chain end concentration is greater than 0.001 M.

i) Terminators

Terminators for use in the methods described herein include any compound that is capable of deactivating a Lewis acid. Terminators, in some embodiments, decompose a Lewis acid or destroy the Lewis acid character of a compound. In some embodiments, the terminator is a base and/or nucleophile. In some embodiments, the terminator is an organic base. In some embodiments, the terminator is an electron donor. In some embodiments, the terminator does not add to and end cap the growing polymer.

In the methods described herein, one or more terminators may be added at a desired time to deactivate the Lewis acid present in the polymerization reaction. One or more terminators may be added, in some embodiments, after the addition of the quenching agent. For example, in some embodiments, a compound of formula I is synthesized by allowing polymerization of the monomer to proceed for a desired time, then adding a compound of formula III to functionalize the growing polymer, and then adding a terminator to deactivate the Lewis acid.

In some embodiments, the terminator is an alcohol or amine. In some embodiments, the terminator is a pyridine derivative. Exemplary terminators include, but are not limited to, methanol, ethanol, isopropanol, or water. In some embodiments, the terminator is a pyridine derivative. In some embodiments, the terminator is methanol. In some embodiments, the terminator is diethylamine, triethylamine, pyridine, 2,6-lutidine, n-butylamine, or tert-amylamine.

7. COMPOUNDS

Provided herein are compounds of formula II:

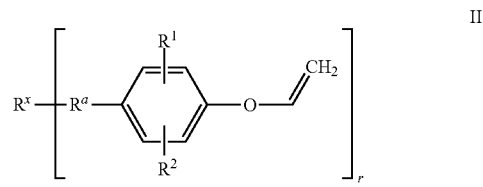

wherein $R^1$ and $R^2$ are each, independently, H, alkyl, or alkoxy;

$R^a$ is a polyisobutylene group; and $R^x$ is an initiator residue.

In some embodiments, $R^1$ and $R^2$ are each, independently, H, alkyl of 1 to 6 carbons or alkoxy of 1 to 6 carbons. In some embodiments, $R^1$ and $R^2$ are each, independently, alkyl of 1 to 3 carbons or alkoxy of 1 to 3 carbons. In some embodiments, $R^1$ and $R^2$ are H. In some embodiments, at least one of $R^1$ and $R^2$ is H. In some embodiments, $R^1$ and $R^2$ is tert-butyl.

In some embodiments, r is an integer from 1 to 3. In some embodiments, r is 1 or 2. In some embodiments, r is 1.

In some embodiments, r is 1 and $R^x$ is

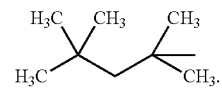

In some embodiments, r is 2 and $R^x$ is

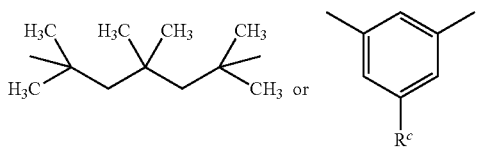

wherein $R^c$ is H or alkyl.

In some embodiments, $R^x$ has the formula $(-CR_aR_b)_rR_c$, wherein $R_a$ and $R_b$ are each independently hydrogen, alkyl, aryl, alkaryl, or aralkyl, provided that at least one of $R_a$ and $R_b$ is not hydrogen, and $R_c$ is an aliphatic or aromatic univalent or polyvalent radical with valence r, wherein n is an integer from 1 to 4. In some embodiments, $R_c$ is hydrocarbyl. In some embodiments, $R_c$ is aryl. In some embodiments, $R_c$ is alkyl. In some embodiments, $R_c$ is phenyl. In some embodiments, r is 1. In some embodiments, r is 2. In some embodiments, r is 3. In some embodiments, r is 4.

In some embodiments, $R^a$ is

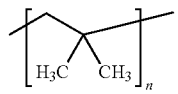

wherein n is an integer from 1 to 10,000.

In further embodiments, n is an integer from 10 to 10,000, from 50 to 10,000, 100 to 10,000, 500 to 10,000, or 1,000 to 10,000. In further embodiments, n is an integer from 10 to 5,000, 50 to 5,000, 100 to 5,000, or 500 to 5,000. In further embodiments, n is an integer from 10 to 1,000, 50 to 1,000, 100 to 1,000, or 500 to 1,000.

In some embodiments, the molecular weight of the compound is from $1.0 \times 10^3$ to $1.0 \times 10^5$ g/mol or $1.0 \times 10^3$ to $1.0 \times 10^4$ g/mol. In some embodiments, the molecular weight is from $1.0 \times 10^3$ to $3.0 \times 10^3$ g/mol or $2.0 \times 10^3$ to $3.0 \times 10^3$ g/mol.

In some embodiments, the polydispersity index of the compound is less than 1.6, less than 1.5, less than 1.4, less than 1.3, less than 1.2, less than 1.1, or less than 1.05.

The embodiments and examples described above are intended to be merely exemplary, and such examples and embodiments are non-limiting. For example, included within the scope of the subject matter described herein are all combinations of the embodiments described herein. In addition, one of ordinary skill in the art will recognize, or will be able to ascertain using no more than routine experimentation, modifications of the embodiments and examples described herein. Such modifications are considered to be within the scope of the claimed subject matter and are encompassed by the appended claims.

8. EXAMPLES

A two step synthesis to create polyisobutylene vinyl ether macromer involved 1) end-quenching a $TiCl_4$-catalyzed quasiliving isobutylene polymerization with (2-chloroethoxy) benzene and 2) subsequent dehydrochlorination with potassium tert-butoxide.

The polymerization and quenching reactions were performed in a dry $N_2$-atmosphere glove box. Hexane (185 mL) and methyl chloride (280 ml) were chilled to 70° C. and placed in a 1 L round bottom reaction flask. To the 40/60 (v/v) hexane/methyl chloride co-solvent mixture were added 4.20 g of 2-chloro-2,4,4 trimethylpentane (TMPCl) and 0.33 mL of 2,6-lutidine. A final molecular weight of 2300 g/mol was targeted by charging the reactor with 84.8 mL of isobutylene. After thermal equilibration. the polymerization was initiated with 0.93 mL of titanium tetrachloride ($TiCl_4$.). After complete monomer conversion (approx, 48 min), 7.84 ml of (2-chloroethoxy)benzene was charged to the reactor along with an additional 5.28 ml of $TiCl_4$ to increase the rate of (2-chloroethoxy}benzene alkylation. After 3 h, the excess $TiCl_4$ was destroyed by the addition of methanol. The methyl chloride was allowed to evaporate: the hexane layer containing the polymer was then separated from the methanol layer and washed twice with water. The polymer was then precipitated from hexane into methanol. Finally, the polymer was taken up in hexane, washed once more with water, and dried over magnesium sulfate, and the residual solvent was removed with vacuum.

The second, post-polymerization step was dehydrochlorination of the (2-chloroethoxy)phenyl-capped polyisobutylene. Heptane (200 ml) was used to dissolve 60 g of p-(2-chloroethoxy)polyisobutylbenzene. To this mixture was added an equal volume of N,N-dimethylformamide (200 mL). After adding 14.6 g of potassium tert-butoxide, the reaction was heated to reflux where it became mono-phasic. After 1 h, the PIB had become quantitatively dehydrochlorinated. The reaction mixture was cooled and allowed to phase separate. The heptane layer containing the polymer was washed three times with deionized water. The polymer solution was then dried with magnesium sulfate, and the residual solvent was removed under vacuum. Gel permeation chromatography (GPC) and light scattering analysis (assuming 100% mass recovery) provided an estimated number average molecular weight ($M_n$) of $2.7 \times 10^3$ g/mol with a polydispersity (PDI) of 1.23 after polymerization/quenching (before dehydrochlorination). After dehydrochlorination the $M_n$ was estimated to be 2.6×103 g/mol with a PDI of 1.23. A $^1$H NMR spectrum of the polyisobutylene vinyl ether macromer is shown in FIG. 1.

What is claimed:
1. A method for preparing a telechelic polymer comprising contacting a compound of formula I:

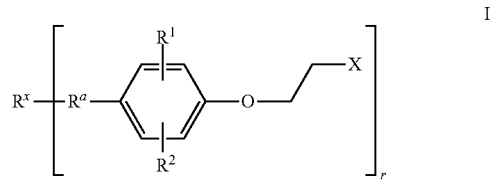

with a base, wherein:
$R^1$ and $R^2$ are each, independently, H, alkyl, or alkoxy;
$R^a$ is a polyisobutylene group;
$R^x$ is an initiator residue;
r is an integer from 1 to 4; and
X is —Cl, —Br, —I, or —OC(O)R, wherein R alkyl, alkenyl, alkynyl, alkaryl, aryl, or heteroaryl.
2. The method of claim 1, wherein $R^1$ and $R^2$ are H.
3. The method of claim 1, wherein X is —Cl.
4. The method of claim 1, wherein the base is a metal hydroxide or metal alkoxide.
5. The method of claim 4, wherein the base is MOR, wherein M is sodium or potassium, and R is H or alkyl.
6. The method of claim 5, wherein the O is bonded to R on a secondary or tertiary carbon.
7. The method of claim 5, wherein the base is potassium tert-butoxide.

8. The method of claim 1, wherein the compound of formula I contacts with the base to form a compound of formula II:

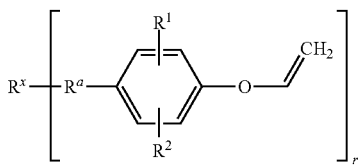

wherein:
$R^1$ and $R^2$ are each, independently, H, alkyl, or alkoxy;
$R^a$ is a polyisobutylene group;
$R^x$ is an initiator residue; and
r is an integer from 1 to 4.

9. The method of claim 1, wherein r is 1.

10. The method of claim 1, wherein r is 1 and $R^x$ is

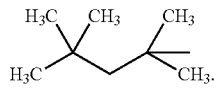

11. The method of claim 1, wherein r is 2 and $R^x$ is

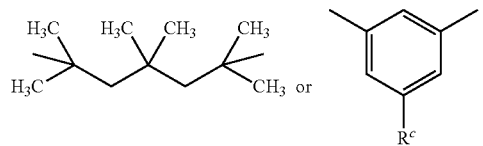

wherein $R^c$ is H or alkyl.

12. The method of claim 1, wherein the method is performed in the presence of a diluent.

13. The method of claim 12, wherein the diluent is a mixture of a non-polar solvent and an aprotic dipolar solvent.

14. The method of claim 13, wherein the non-polar solvent is a heptane and the aprotic dipolar solvent is N,N-dimethylformamide.

15. The method of claim 13, wherein the method is performed at a refluxing temperature.

16. The method of claim 1, wherein the compound of formula I is formed by
(a) generating a quasiliving carbocationic polyolefin; and
(b) reacting the quasiliving carbocationic polyolefin from step (a) with one or more compounds of formula III in the presence of a Lewis acid or mixture of Lewis acids under quasiliving carbocationic polymerization conditions:

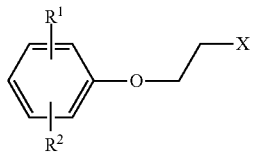

wherein:
$R^1$ and $R^2$ are each, independently, H, alkyl, or alkoxy; and
X is —Cl, —Br, —I, or —OC(O)R, wherein R is alkyl, alkenyl, alkynyl, alkaryl, aryl, or heteroaryl.

17. The method of claim 16, wherein the quasiliving carbocationic polyolefin is prepared by adding a Lewis acid and a monomer to an initiator in the presence of an electron donor, common ion salt, or common ion salt precursor.

18. The method of claim 17, wherein the initiator is 2-chloro-2,4,4-trimethylpentane.

19. The method of claim 17, wherein the monomer is isobutylene.

20. The method of claim 17, wherein the electron donor is 2,6-lutidine.

21. The method of claim 17, wherein the Lewis acid is a titanium tetrahalide.

22. The method of claim 16, wherein steps (a) and (b) are performed in the presence of a diluent.

23. The method of claim 22, wherein the diluent is a mixture of hexanes and methyl chloride.

24. A product formed by the method of claim 1.

25. The product of claim 24, wherein the polydispersity index of the product is less than 1.3.

* * * * *